US011387480B2

(12) United States Patent
Selby et al.

(10) Patent No.: US 11,387,480 B2
(45) Date of Patent: Jul. 12, 2022

(54) STACK OF INTERMEDIATE TEMPERATURE, METAL-SUPPORTED, SOLID OXIDE FUEL CELL UNITS

(71) Applicant: Ceres Intellectual Property Company Limited, Horsham (GB)

(72) Inventors: Mark Selby, Crawley (GB); Stephen Hill, Coventry (GB); Stephen Phillip, Horsham (GB); Lee Rees, Horsham (GB)

(73) Assignee: CERES INTELLECTUAL PROPERTY COMPANY LIMITED, Horsham (GB)

( * ) Notice: Subject to any disclaimer, the term of this patent is extended or adjusted under 35 U.S.C. 154(b) by 244 days.

(21) Appl. No.: 16/645,452

(22) PCT Filed: Sep. 11, 2018

(86) PCT No.: PCT/GB2018/052582
§ 371 (c)(1),
(2) Date: Mar. 6, 2020

(87) PCT Pub. No.: WO2019/053419
PCT Pub. Date: Mar. 21, 2019

(65) Prior Publication Data
US 2020/0280088 A1    Sep. 3, 2020

(30) Foreign Application Priority Data
Sep. 12, 2017   (GB) ..................... 1714665

(51) Int. Cl.
*H01M 8/248* (2016.01)
*H01M 8/2457* (2016.01)
(Continued)

(52) U.S. Cl.
CPC ......... *H01M 8/248* (2013.01); *H01M 8/0276* (2013.01); *H01M 8/04197* (2016.02);
(Continued)

(58) Field of Classification Search
None
See application file for complete search history.

(56) References Cited

U.S. PATENT DOCUMENTS 5,853,175 A  * 12/1998  Udagawa ............. F16J 15/0825
                                                           277/595
7,531,262 B1 *  5/2009  Simpson ............. H01M 8/0247
                                                           429/450
(Continued)

FOREIGN PATENT DOCUMENTS

CN      101411021 B     8/2011
DE      199 17 722 A1  10/2000
(Continued)

OTHER PUBLICATIONS

Search Report dated Jan. 13, 2021, in Russian Patent Application No. 2020113251.
(Continued)

*Primary Examiner* — Jeremiah R Smith
(74) *Attorney, Agent, or Firm* — SGPatents PLLC

(57) ABSTRACT

A stack (1) of intermediate temperature, metal-supported, solid oxide fuel cell units (10), each unit comprising a metal support substrate (12), a spacer (22) and an interconnect (30) that each have compression bolt holes (34), fuel inlet port (33), fuel outlet port (32) and air outlet (17) therein, wherein bolt voids (34) are formed by aligning the bolt holes and a further void (17) by aligning the air outlets, and the voids are vented, for example, to the environment or further void to prevent the build-up of fuel, moisture or ions.

20 Claims, 8 Drawing Sheets

(51) Int. Cl.
  *H01M 8/04082* (2016.01)
  *H01M 8/0276* (2016.01)
  *H01M 8/12* (2016.01)
  *H01M 8/2425* (2016.01)
  *H01M 8/242* (2016.01)
  *H01M 8/2432* (2016.01)

(52) U.S. Cl.
  CPC ........... *H01M 8/12* (2013.01); *H01M 8/2425* (2013.01); *H01M 8/2457* (2016.02); *H01M 8/242* (2013.01); *H01M 8/2432* (2016.02); *H01M 2008/1293* (2013.01)

(56) References Cited

U.S. PATENT DOCUMENTS

| | | | | |
|---|---|---|---|---|
| 2006/0292428 A1* | 12/2006 | Suh | .................. | H01M 8/242 429/434 |
| 2009/0226786 A1* | 9/2009 | Selcuk | ................ | H01M 8/2483 429/454 |
| 2012/0107714 A1* | 5/2012 | Day | .................. | H01M 8/12 429/457 |
| 2016/0056492 A1* | 2/2016 | Tsuga | .................. | H01M 8/241 429/458 |
| 2016/0380298 A1* | 12/2016 | Leah | .................. | H01M 8/2432 429/465 |
| 2020/0280088 A1* | 9/2020 | Selby | .................. | H01M 8/0276 |

FOREIGN PATENT DOCUMENTS

| | | |
|---|---|---|
| EP | 2 980 904 A1 | 2/2016 |
| JP | 2002-367647 A | 12/2002 |
| JP | 2013-243023 A | 5/2013 |
| RU | 2067339 C1 | 9/1996 |
| RU | 2414773 C2 | 3/2011 |
| RU | 122053 U1 | 11/2012 |
| WO | WO 2007/024640 A1 | 3/2007 |
| WO | WO 2015/136295 A1 | 9/2015 |

OTHER PUBLICATIONS

English translation of Decision to Grant dated May 26, 2021, in Russian Patent Application No. 2020113251.
First Examination Report dated Aug. 10, 2021, in Indian Patent Application No. 202017013120.
International Search Report for International Patent Application No. PCT/GB2018/052582, dated Oct. 30, 2018.
International Preliminary Report on Patentability for International Patent Application No. PCT/GB2018/052582, dated Mar. 26, 2020.
Search Report for GB Patent Application No. GB1714665.5, dated Mar. 7, 2018.

* cited by examiner

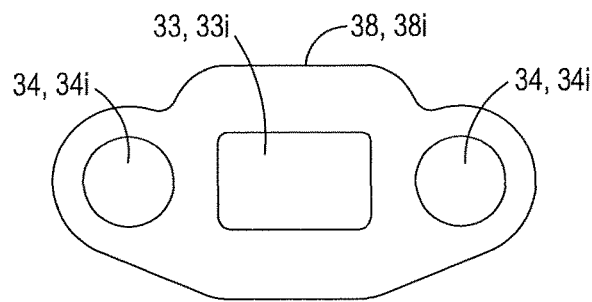
Fig.6 PRIOR ART
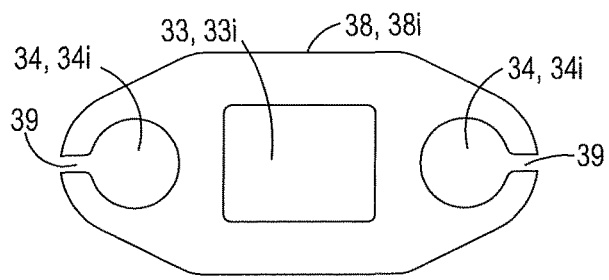
Fig.7
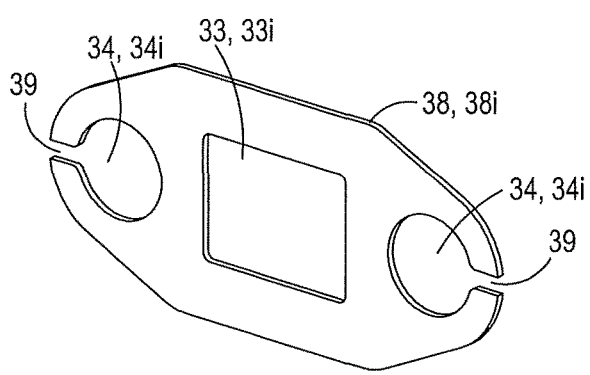
Fig.8
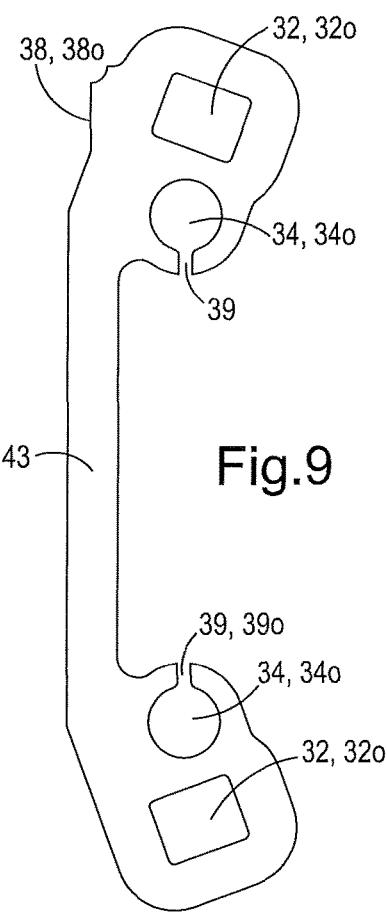
Fig.9
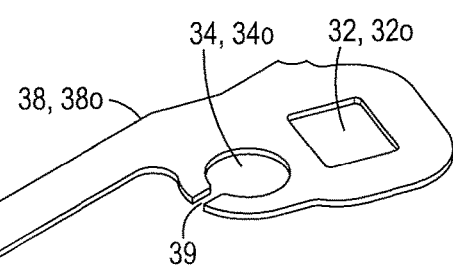
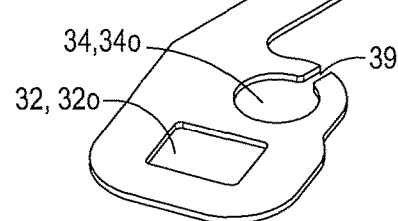
Fig.10

STACK OF INTERMEDIATE TEMPERATURE, METAL-SUPPORTED, SOLID OXIDE FUEL CELL UNITS

The present invention relates to a stack of intermediate temperature, metal supported, solid oxide fuel cell units with improved life expectancy and durability.

An advanced fuel cell stack assembly 5 is known from WO2015/136295, the entire contents of which are incorporated herein by way of reference. It has, as shown in FIG. 1 attached hereto, multiple active solid oxide fuel cell units (SOFCs) 10 arranged in a stack 1, with gaskets 38 fitted between each pair of neighbouring cell units 10. As shown and discussed in WO2015/136295, there can also be dummy cell units 8 within the assembly.

The assembly 5 is all held or compressed together by connecting nuts 3 and bolts 2 between end plates 4.

Each active cell unit 10 has multiple layers such as a metal (usually steel) support substrate 12, a spacer 22, and an interconnect 30, as shown in FIG. 2. The steel substrate 12 contains therein a plurality of holes 36 extending therethrough, and overlying the holes there are the electrochemically active layers 14—an anode, an electrode and between them an electrolyte. Preferred materials for these layers are discussed in the above PCT application. The spacer 22 then spaces that steel substrate 12 from the interconnect 30, typically with the electrochemically active layers 14 disposed on the outside of this fuel cell unit 10. These layers are then welded together to form the individual cell unit 10 with the interconnect 30 on one side of the steel substrate 12 and the electrochemically active layers 14 attached on the other side of the substrate 12—see FIG. 12 for a weld line 90 for a similar cell unit, albeit with a different peripheral shape. The weld line 90 would follow a corresponding path with the cell unit of FIG. 2. This arrangement thus provides an external electrochemically active layer (cathode outermost), with the weld line 90 sealing the fuel within the cell unit from air surrounding the cell unit—(the cell unit has internal fuel flow as the fuel is to contact the anode within the cell unit through underlying holes 36 in the metal substrate).

For forming a stack 1, many of these cell units 10 are stacked together—see, for example, FIG. 3.

The interconnect 30 has surface relief, comprising various lumps or bumps or ridges 42, and corresponding indentations or grooves 40, imprinted or stamped therein, collectively defining two spaced generally planar (but with many gaps) surfaces, one of which (upper in FIG. 2 and lower in FIG. 3) is for having a cell unit—electrochemically active layers 14 facing down—placed thereon. The other surface of the interconnect 30 is instead touches the steel support substrate 12 of its own cell unit 10—through the spacer 22. Further, since the planar surfaces are not complete, they only touch in certain locations, whereby they won't block off many of the previously mentioned holes 36 formed in the steel support substrate 12 of its own cell unit 10, and will touch only a similarly restricted amount of the other cell unit's 10 electrochemically active layers' 14 outer surface.

The shape of the lumps, bumps, ridges, indentations and grooves, or such like, 40, 42 are also differently or oppositely arranged between neighbouring cell units to allow, for example, a bump 40 of a first cell unit 10 to align under an indentation 42 of a second cell unit 10, whereby any force from a first interconnect 30 of a first cell unit 10 against the electrochemically active layers 14 of a second cell unit 10 will be neutralised by a corresponding opposing force generated by the interconnect 30 of that second cell unit 10, etc., when the stack 1 is assembled and clamped together by the nuts 3 and bolts 2.

The lumps or bumps, ridges or troughs, etc. 40, and corresponding indentations or grooves 42, are also shaped and positioned to define passageways on either side of the interconnects 30, when stacked, for the air (usually on an outer surface) and fuel (usually on an inner surface), such as in FIG. 3, so that the fuel cell stack can work when in operation.

In WO2015/136295, and preferably in the present invention, the fuel cell units are intermediate temperature, metal supported, solid oxide fuel cell units.

An example of a metal supported fuel cell stack 1, for giving a better illustration of this stacked effect, is shown schematically in FIG. 3. The metal supported fuel cell stack 1 comprises multiple stacked fuel cell units 10, each of which has a flat steel plate—the metal support substrate 12, as in FIG. 2, with holes 36 drilled or laser cut through the substrate 12 for accessing a closest (usually anode) layer of the electrochemically active layers 14 that will be deposited on the steel substrate 12 from the other side of the substrate 12, a spacer 22 forming generally a ring around the opposite side of the steel substrate 12, and an interconnect 30 with dimples, troughs, ridges and bumps etc. 40, 42 for connecting with the next cell unit, all welded together generally around the electrochemically active layers 14 and any fuel inlet chimney, 33 and fuel outlet chimney 32, (see FIGS. 2 and 12) to form the complete cell unit 10. As the holes 36 underlying the electrochemically active layers 14 extend no further than the expanse of the electrochemically active layers 14, the weld line 90 encloses the holes 36 to define an inner space with fuel channels 31 so that fuel will be able to flow inside the cell unit 10, in the inner space within the cell unit delimited by the weld line 90, through the fuel channels 31 between the dimples or troughs, without leaking (the holes 36 don't leak due to the overlying electrochemically active layers 14 blocking them off), and the fuel will thus access the electrochemically active layers 14 through the holes 36.

In this arrangement, the air instead effectively surrounds the cell unit 10, flowing around the cell unit 10 and in between adjacent cell units 10 through air channels 23 and out through an air outlet 17, so that the air can contact the cathode of the electrochemically active layers 14 in the stack 1 (the cathode being the outer layer of the electrochemically active layers 14 of each active cell unit 10).

The weld line 90 is thus part of the arrangement that ensures that the fuel and air cannot mix within the cell unit 10.

These principals are all known from the prior art, such as the above mentioned PCT application, although the shape of the cell unit 10 in FIGS. 11 and 12 is new.

Referring to FIGS. 1 and 2, in addition to the weld line 90—similar to that of FIG. 12, the fuel is separated from the air flowing around and through the fuel cell units by gaskets 38, the gaskets 38 having holes 32$i$, 33$o$ in them—for the fuel ports 32, 33 (inlets 33$i$ or outlets 32$o$) and bolt holes 34$i$, 34$o$. This prior art example has two forms of gasket—an inlet gasket 38$i$ and an outlet gasket 38$o$. There are thus inlet gasket bolt holes 34$i$ and outlet gasket bolt holes 34$o$. These bolt holes 34 allow the gaskets 38 to be retained within the stack 1 during stack assembly and compression by the bolts 2.

The bolt holes 34$i,o$ of the inlet and outlet gaskets 38$i,o$, when the stack 1 is assembled (see FIG. 1, and note also FIG. 11), are aligned with bolt voids 34 for the bolts 2 in the cell units 10; and the fuel ports 33i, 32o of the inlet and outlet gaskets 38i,o, are aligned with the fuel inlet chimneys 33 and/or outlets chimneys 32 in the cell units 10.

Fuel inlet chimneys 33 and/or outlets chimneys 32 in the cell units 10, and the aligned fuel ports of the gaskets 33i, 32o then complete substantially continuous internal fuel manifolding extending through/along the stack 1 with cell unit 10 access at fuel inlet ports 33b of the spacers 22 and fuel outlet ports 32b of the spacers 22. For the bolts 2, the respective alignment of the bolt holes of the interconnect, the spacer, the substrate, the inlet gasket and the outlet gasket 34 should be a straight void so that the bolts 2, which are commonly straight, can push through the stack 1. For the fuel manifolding, the path can be more tortuous, as fuel will travel around corners. Nevertheless, as shown it is usually also straight for convenience.

The fuel inlet and outlet chimneys 33, 32 provide cell unit 10 access via the fuel inlet and outlet ports 33b, 32b in the spacers 22, to provide entry and exit routes for fuel flow to or from each cell unit 10 to ensure activity from all cell units 10.

Once assembled, the bolts 2 will not touch the respective cell units 10 as that would earth the fuel cell units 10, thus rendering the stack 1 useless.

The bolts 2 are themselves earthed for safety.

See FIG. 1 for an example of this stacking/bolt arrangement.

The present inventors have noted, however, that in the product of the prior art, there have been a number of instances of failure at the gasket, with fuel mixing with air and leading to combustion, or more explosively, electrical shortage between the bolts and the metal of the cell units causing blowthrough through one or more gasket between the bolt void and the external air manifolding. The present invention is therefore intended to improve the design of the stack to extend the life expectancy of a fuel cell, and its gaskets, by preventing such failures.

According to the present invention there is provided a stack of intermediate temperature metal supported, solid oxide fuel cell units comprising multiple fuel cell units arranged in a stack 1 wherein each fuel cell unit comprises a metal support substrate with electrochemically active layers, a spacer and an interconnect, wherein the metal support substrate, the spacer and the interconnect have bolt holes for compression bolts of the stack, at least one fuel inlet and at least one fuel outlet for fuel entry and exit into and out of the cell unit, and at least one air outlet for air venting, wherein bolt voids are formed within the stack by the alignment of the respective bolt holes for the compression bolts in the stack and a further void by the alignment of the respective air outlets for the air venting, characterised in that the bolt voids for the compression bolts each are vented. The venting is preferably either to the environment surrounding the stack or into an air outlet or venting tube.

Preferably, gaskets are located between neighbouring cell units. The gaskets may be integral to the cell units, but preferably the stack further has separate gaskets between neighbouring cell units in the stack, the separate gaskets having at least one fuel port aligning with fuel inlet or outlet chimneys in the cell units either side thereof, and at least one further bolt hole aligning with the bolt holes for the compression bolt in the stack either side thereof. The gaskets for an intermediate temperature metal supported fuel cell stack may be mica or talc based.

Preferably there are more than two bolt holes for compression bolts in each cell—ideally at least two at each end of the cell unit. Preferably the bolt voids formed therewith, in the stack, are all vented.

Preferably the gaskets each have two further bolt holes, thus bridging between the bolt holes in the neighbouring cell units.

Preferably the gaskets—preferably the separate ones—provide the venting by having their bolt holes slotted in a side thereof—preferably out to the outer edge of the gasket.

The cell units themselves, however, could equally provide venting by their own bolt holes comprising a slot, although separate gaskets could tend to at least partially block such slots in the cell units, due to their greater compressibility, so having the slots in the separate gaskets is preferred.

There may be two or more fuel outlet ports for a cell unit, so the relevant gaskets therefor may have two or more fuel outlet ports—usually an appropriate number aligning over all the fuel outlet ports at an end or side of the fuel cell unit. It can likewise align over any or all bolt holes on that end or side.

The separate gaskets are typically arranged at two respective end regions of the individual cell units, i.e. at or near the narrow sides of a stack in the event of generally rectangular cell units.

The stack is preferably arranged with four bolts extending end to end of the stack, with two bolts at each narrow side—i.e. at two ends or end regions of the cell units. The gaskets thus preferably each have two bolt holes. Alternatively, more than one gasket may be fitted between each of the cell units at each end of each cell unit, but that complicates the assembly.

There can be slots for venting in each bolt hole of each separate gasket to give complete venting of the bolt voids, or alternatively there may be some vented gaskets and some non-vented gaskets, to reduce the extent of venting.

The cell units themselves, or some of them, may additionally or instead be vented, as mentioned before.

The present inventors developed this venting for the bolt voids as they realised that hydrogen, moisture or ions were somehow leaking into the bolts' voids and was building up enough to enable the failure. The mode of failure has thus been identified generally to be one or more of, or probably a combination of, combustion in the bolt voids due to diffused hydrogen in the bolt void reacting with the oxygen of the air therein, potentially explosively, due to the temperature of the stack—commonly between 500 and 700 degrees C. for an intermediate temperature fuel cell assembly, ionisation from ions leaking from the gaskets, and electrical shorting due to the environment thereby produced. They concluded that the hydrogen was diffusing through the gaskets through the miniscule pores therein. Alternatively or additionally, it was concluded that ionisable elements in the gasket material were becoming liberated from the gasket, perhaps due to the combustion or general temperature of the fuel cell assembly and/or due to the compression forces exerted through the gaskets, and those ions were then accumulating in the bolt void over time, commonly less than a hundred hours of running, leading to a lowered electrical breakdown voltage and thus allowing an electrical short to occur between the bolt or tie bar and the cell units. The inventors thus looked to solve this and came up with the idea that venting could be provided to release the slowly diffusing hydrogen and ions into the larger airflow of the surrounding environment or the air outlet, thus removing the danger of an excessive hydrogen and ion build-up, whereby neither combustion of the hydrogen nor electrical short through the ions could occur, thereby removing that risk of failure. In brief, therefore, the bolt voids that initially were not thought of as being for any kind of air/fuel venting, are now being used as flow channels to vent any leaked ion gases out of such bolt voids, thus preventing the above-discussed modes of failure from occurring.

Preferably the gaskets have a shape, a part of which generally matches an adjacent part of the outside form of the cell unit so that in the stack the gaskets retain the generally neat and uniform form of the stack. The parts of the outside form of the cell units is typically the thinner or shorter sides of the cells.

The present invention also provides a gasket comprising at least one fuel port and two bolt holes, the bolt holes usually being generally circular, and the fuel port being of any chosen shape, but commonly generally rectangular. The fuel port generally has a full perimeter wall whereas the two bolt holes can have slots within their perimeter wall, breaking their periphery, the slots preferably extending from the perimeter wall to the outer wall of the gasket, the two generally circular bolt holes thus being vented by the slots.

Preferably the at least one fuel port is a central fuel port with the two generally circular bolt holes on either side thereof. The central port may be generally rectangular.

The at least one fuel port may instead be a pair of fuel ports at either end of the gasket.

Preferably the two ends of the gasket are spaced apart by an arm of the gasket that is thinner than the ends of the gasket. Preferably the two bolt holes are located on respective ends of the gasket. Preferably the two bolt holes are located inward of the pair of fuel ports on the ends of the arm.

Preferably the slots of the bolt holes extend parallel to one another.

Preferably slots of the bolt holes both extend along a line extending between the centres of the two generally circular bolt holes.

Preferably the gasket is substantially symmetrical across the line extending perpendicular to a line extending between the centres of the two generally circular bolt holes.

These and other features of the present invention will now be described in further detail, purely by way of example, with reference to the accompanying drawings in which:

FIG. 6 shows a separate inlet gasket from the fuel cell stack assembly of the above mentioned PCT application;

FIGS. 7 and 8 show an inlet gasket for the present invention for the fuel entry end of the cell unit;

FIG. 9 and FIG. 10 show an outlet gasket for the present invention, but for locating at the fuel exit end of the cell unit;

Figure 1:
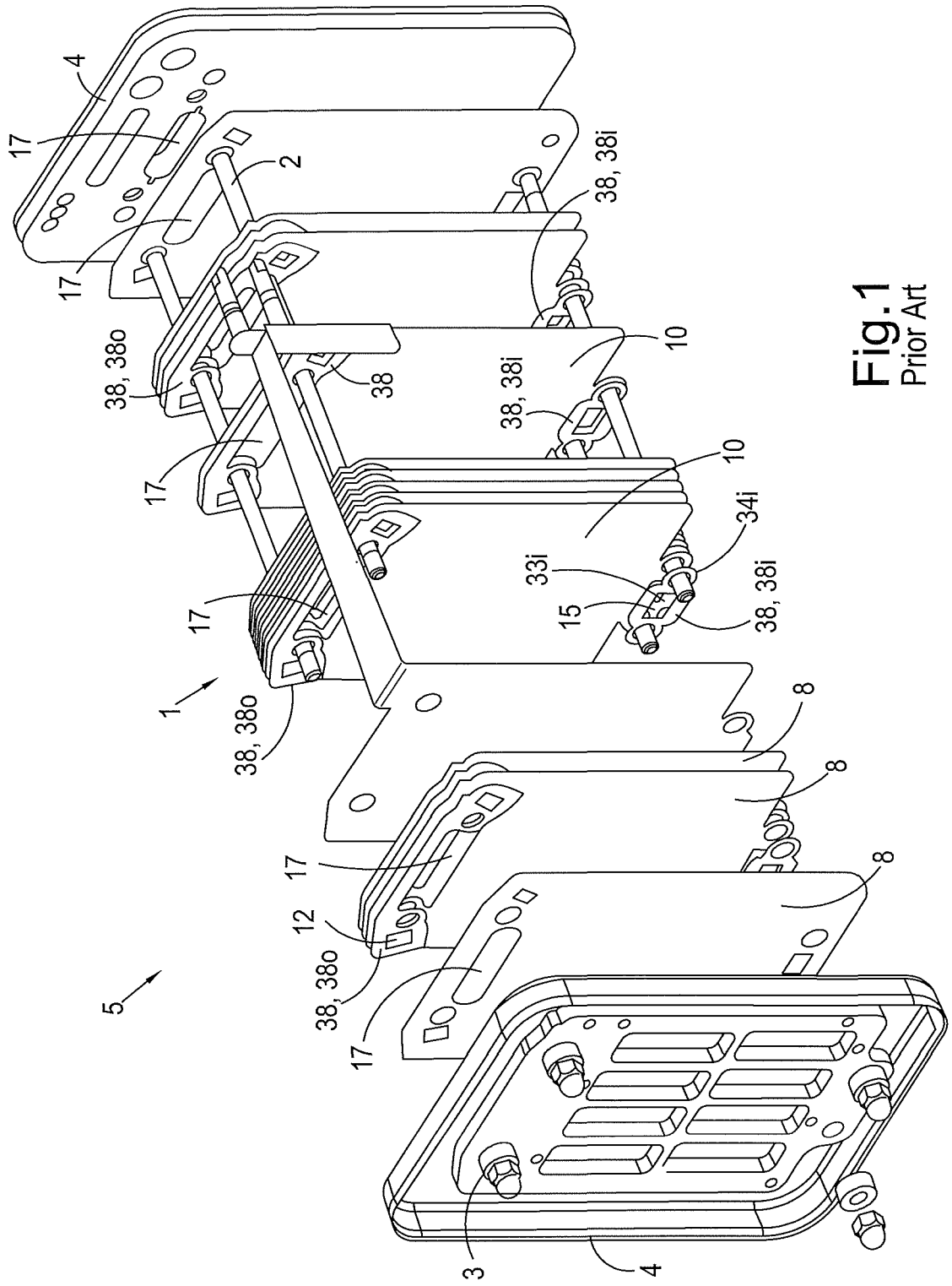
FIG. 1 shows in exploded form a prior art stack arrangement as per the above mentioned PCT application.
Figure 2:
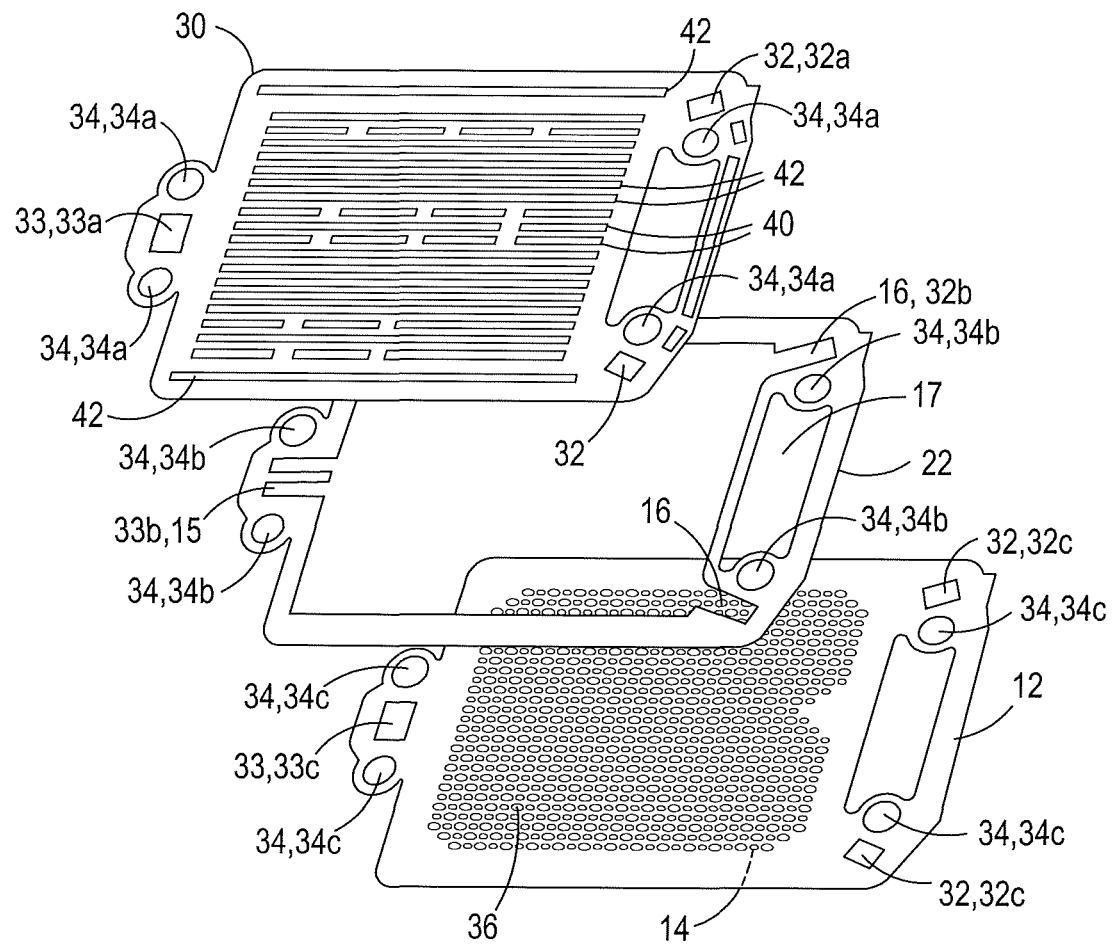
FIG. 2 shows in exploded form the arrangement of a cell unit within the stack.
Figure 3:
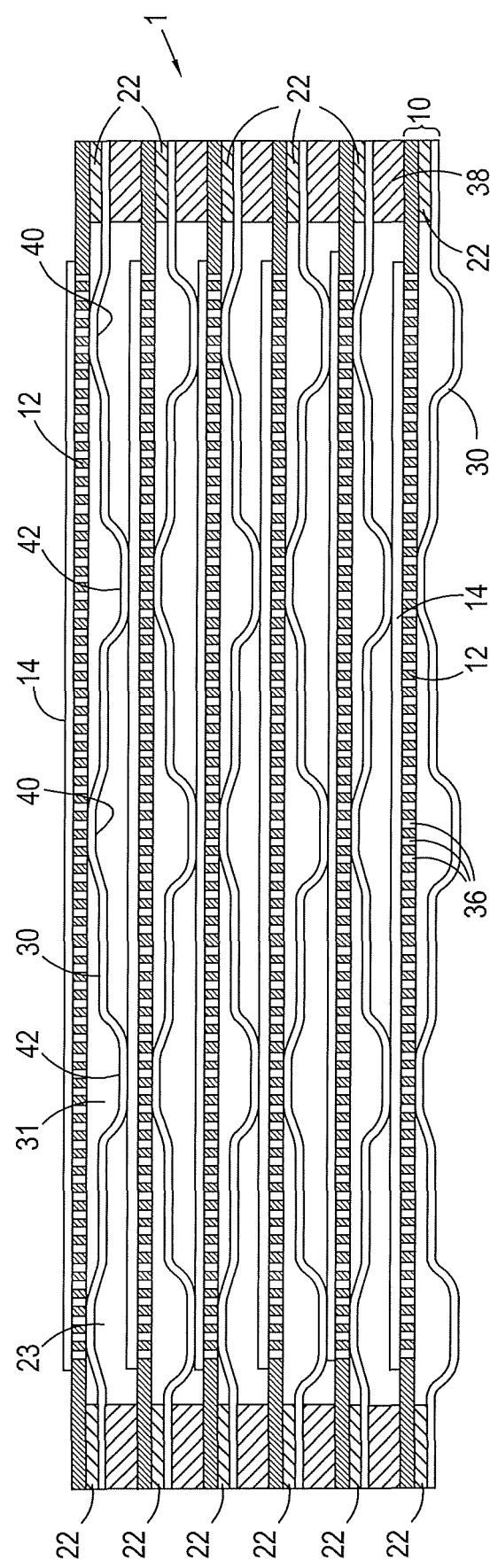
FIG. 3 shows in schematic form an arrangement of a stack showing the opposing form of the interconnects of the fuel cell units within the stack, and the gaskets between the fuel cell units.

Referring first of all to FIGS. 1, 2 and 3, these have already been described above and thus no further discussion will be provided in this section. This general arrangement is an arrangement of fuel cell assembly 5 that can benefit from making use of the present invention.

Figure 4:
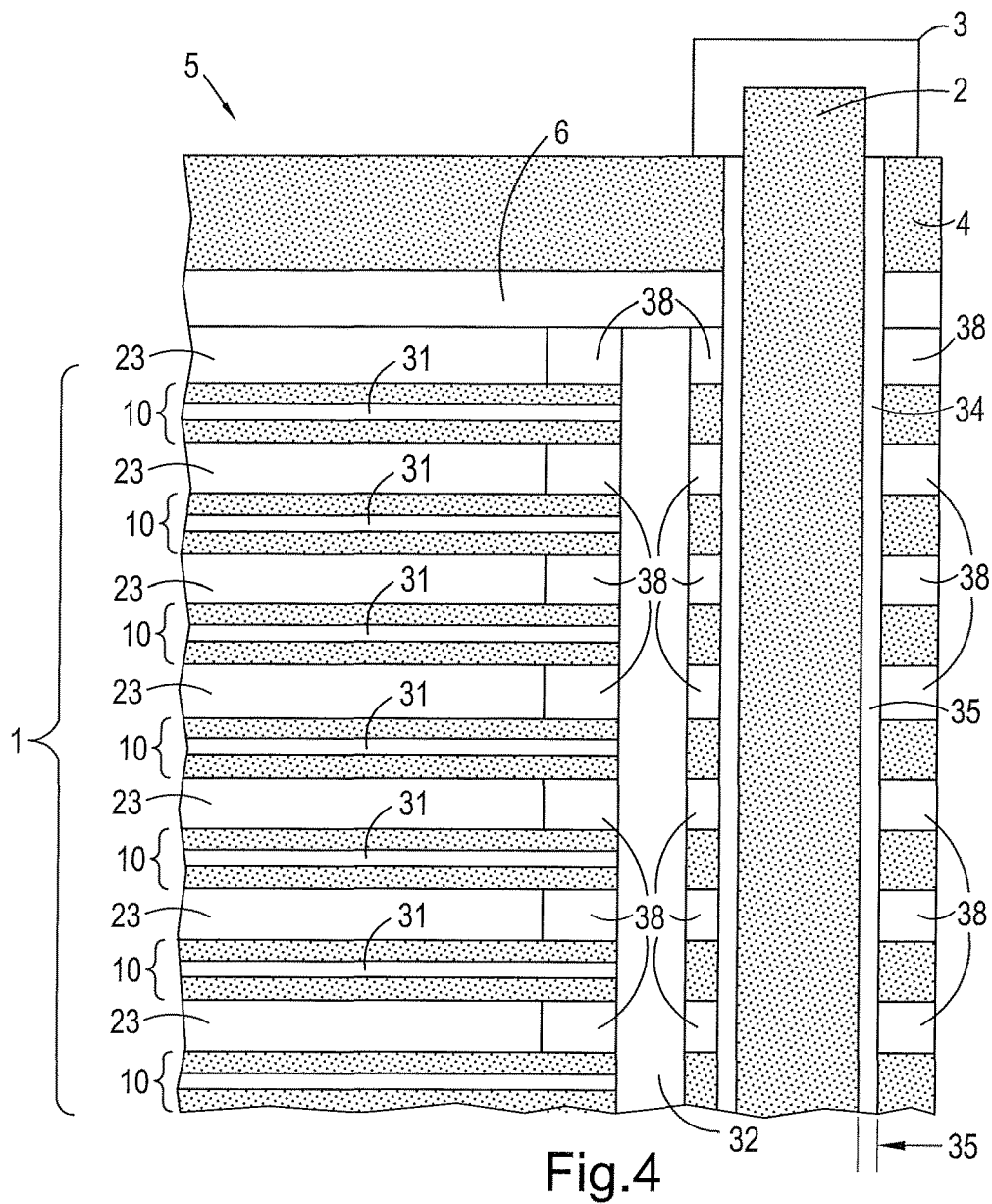
FIG. 4 shows a partial schematic section through the fuel cell units, fuel outlet chimney, bolt void and bolt of a form of fuel cell stack.

Referring next to FIG. 4, there can be seen a schematic arrangement for a fuel cell stack assembly 5 that can also use the invention—without dummy cell units 8. It shows multiple cell units 10 in a stack 1, capped with an earthed top end plate 4 with an electrical insulation gasket 6, usually made of mica, between the top end plate 4 and the stack 1. A bolt 2 (usually four, as in FIG. 1) and nut 3 (again usually four—to correspond with the bolts 2) then compresses the whole lot together, with gaskets 38 between the fuel cell units 10, and between the top fuel cell unit 10 and the electrical insulation gasket 6. In this arrangement air can flow through an air channel 23 above each fuel cell unit 10 (FIGS. 3 and 4) and out through its air outlet 17 (a larger air chimney through the stack 1 as shown more clearly in FIGS. 1 and 2, and 11 and 12).

Fuel instead flows through a fuel channel 31 defined by the spacer and dimples/troughs above, and thus inside each fuel cell unit 10 from the fuel inlet chimney 33, through the fuel inlet port 33b of the spacer 22 to the fuel outlet ports 32b of the spacer 22 and then out through the stack's fuel outlet chimney 32.

As can be seen in FIG. 4, the bolt 2 extends through the bolt void 34 without touching the sides of the void—i.e. without touching the cell units 10. This prevents the bolt 2 from earthing the fuel cell stack 1. A gap 35 is shown in FIG. 4. It is an area into which hydrogen and ions were tending to leak in the prior art non-vented bolt voids.

Referring next to FIG. 6, an example of the inlet gaskets 38i of the prior art is shown. As can be seen, the gasket 38i has two bolt holes 34i located either side of a fuel port 33i. Referring to FIG. 1, this gasket 38i can be seen approximately at the bottom of the middle cell unit of the drawing. It is arranged such that the two bolts 2 thread through the bolt holes 34i of inlet gasket with the fuel port 33i of inlet gasket, —together with the fuel inlet ports 33i, 33a,b,c of the various cell units and the other gaskets, thus also producing a fuel inlet chimney 33 or fuel manifold along the stack. As there is no venting in these gaskets 38, or in the fuel cell units 10, in the fuel cell assembly of FIG. 1, the above-mentioned hydrogen and ion build-up can occur.

Referring next to FIGS. 7 and 8, a similar inlet gasket 38i is shown, albeit with a different external shape, which inlet gasket 38i still has the two bolt holes 34i and the fuel port 33i in the middle, but this time the two bolt holes 34i of inlet gasket are slotted to the surrounding environment by two slots 39—one for each bolt hole 34i. Thus, when these inlet gaskets 38i are stacked with the respective fuel cell units 10, the bolt void 34 formed by the bolt holes 34i of the inlet gaskets 38i and the fuel cell units 10 is now vented to allow diffusion of any hydrogen build-up out of the bolt void 34 and into the surrounding environment. For this stack 1, the surrounding environment is air surrounding the stack.

This inlet gasket 38i has a length of about 45 mm and a width of about 21 mm. It is between 0.5 and 0.9 mm thick. Other thicknesses can be used where needed to accommodate higher or lower bumps or ridges 40 in the interconnect 30. Likewise, widths and lengths can be adjusted depending upon the size or shape of the cell units and the location of the bolt holes 34 and fuel inlet ports 33.

The bolt holes 34 preferably have a diameter of about 8.5 mm for receiving an M8 bolt—or a bolt 2 having approximately an 8 mm diameter. The gap 35 is thus around 0.25 mm on each side of the bolt. The gap 35 can thus be kept small. Larger or smaller gaps might also be provided. Furthermore, larger or smaller holes might be used for larger or smaller bolts 2.

The fuel inlet port 33 is preferably generally rectangular, as shown—preferably around 14 mm by 11 mm, or having a cross sectional area of around 160 mm2. This provides enough area for the fuel transmission into the fuel cell unit. Smaller or larger fuel inlet ports 33 may be provided instead, and would be preferred for stacks requiring lower or higher fuel delivery volumes.

The slots may be 1-2 mm wide, usually 1.4-1.8 mm wide and preferably the slots 39 are around 1.6 mm wide. For the given space around the bolt 2, this has been found adequate for dispersal of hydrogen and ions. The slot 39 can be wider or narrower for increasing or slowing dispersal rates, or if more or less hydrogen and ions need dispersal.

Generally useful sizes of inlet gaskets 38$i$ for the fuel input end of the fuel cell unit 10 will have no greater than twice these dimensions, and no less than half these dimensions, although they are sized to fit the size of the cell unit, and as such can be of any appropriate size given the fuel cells.

Referring next to FIGS. 9 and 10, the outlet gasket 38$o$ for the fuel exit end of the stack 1 is instead shown. This outlet gasket 38$o$ also has two bolt holes 34$o$, but this time positioned inward of two fuel ports 32$o$. Furthermore, the outlet gasket 38$o$ has a more elongated form with an arm 43 connecting two ends (the arm 43 being thinner in plan than the ends), the arm 43 bridging, in use, behind the air outlet 17 of the two fuel cell units 10 against which it will be fitted, one of which is shown in FIG. 11.

Figure 11:
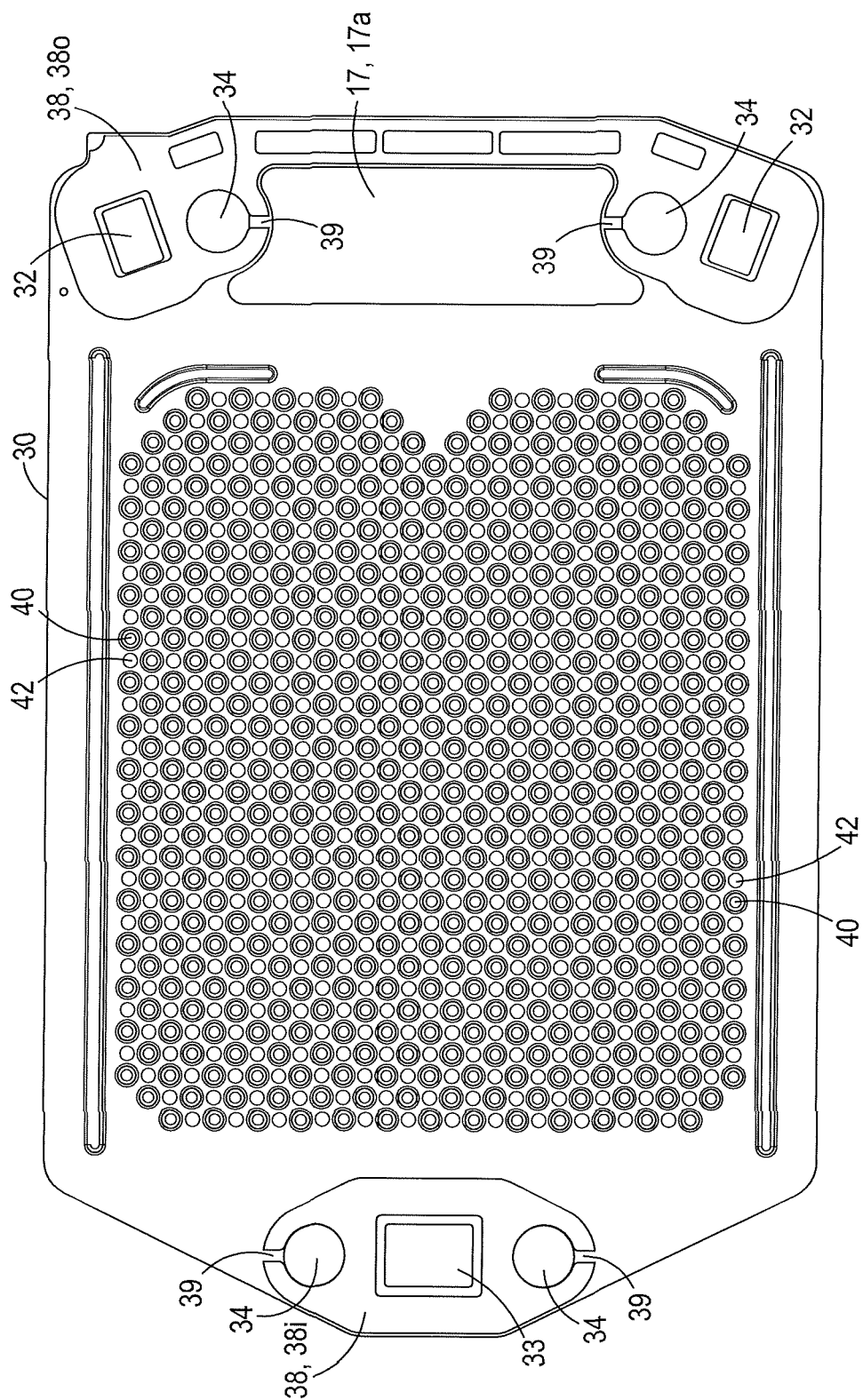
FIG. 11 shows the gaskets positioned on an interconnect of a cell unit—a further cell unit then sits thereon with its electrochemically active layers sitting on the interconnect of the shown cell unit.
Figure 12:
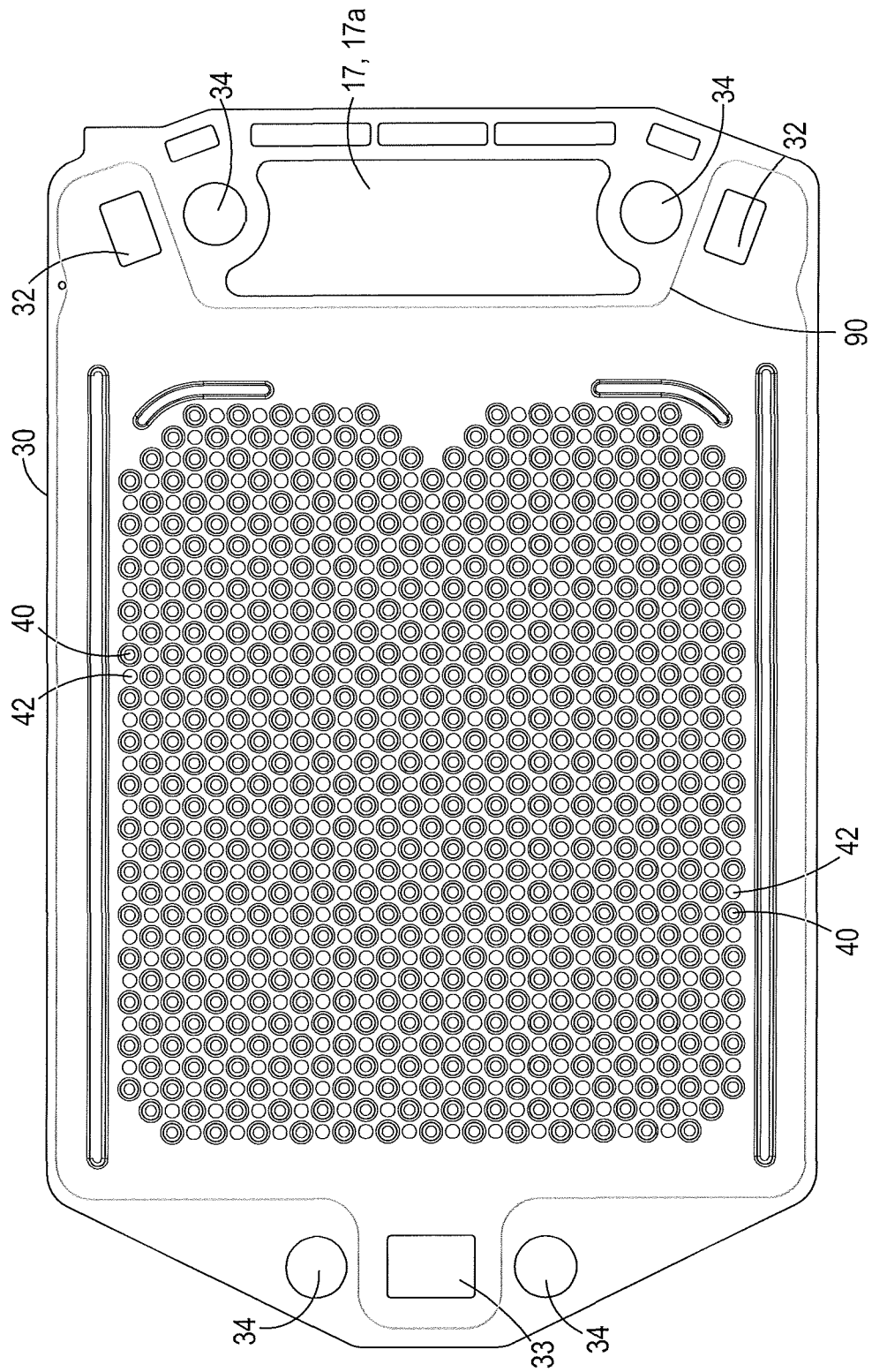
FIG. 12 shows the cell unit of FIG. 11, but with the gaskets removed and the weld line illustrated; and, FIG. 13 shows the cell unit in which the substrate, spacer and interconnect have vented bolt holes.

FIG. 11 also shows the outlet gasket 38$o$ overlying the other end of the fuel cell unit 10. Like the inlet gasket 38$i$ of the invention, this outlet gasket 38$o$ has slots 39 for venting the bolt holes 34$o$ of outlet gasket, but this time for venting into the air outlet 17.

Figure 13:
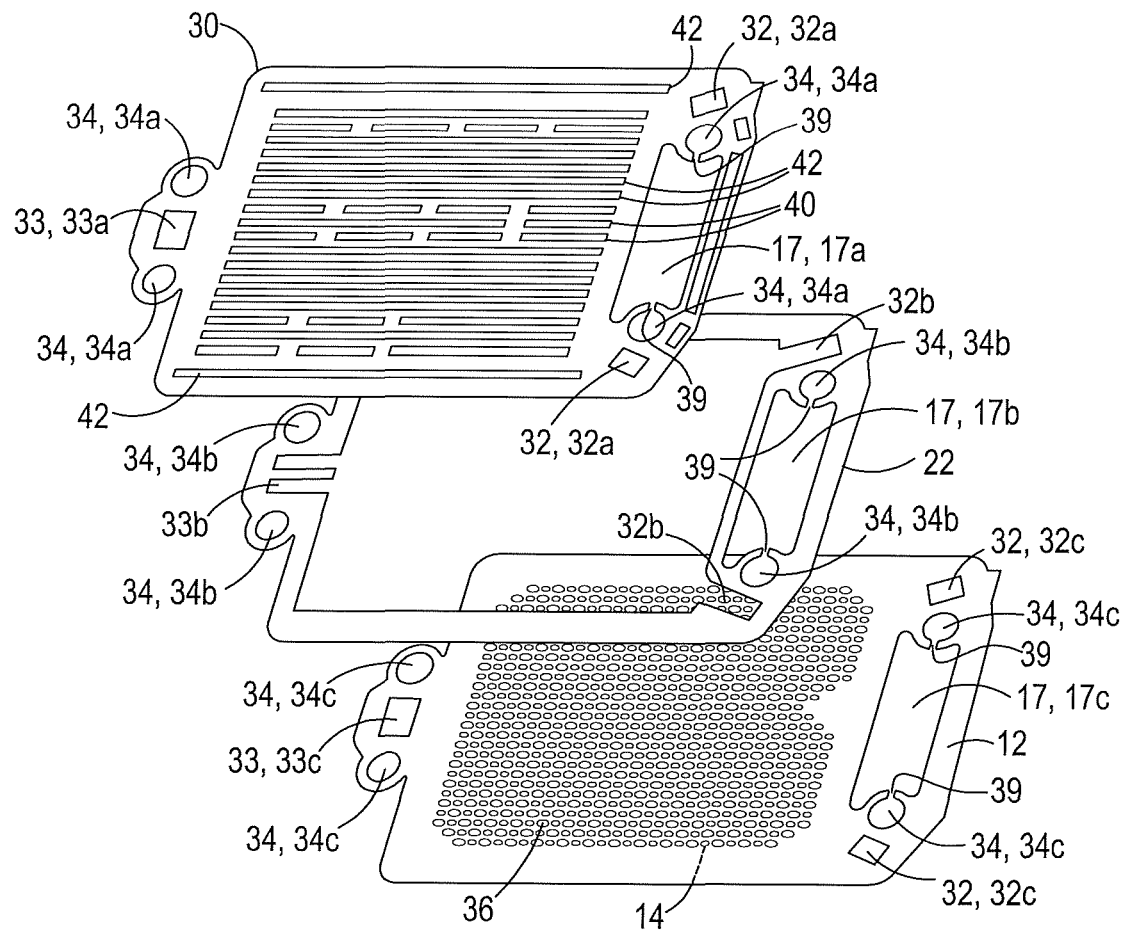

Although the gaskets 38$i,o$ in FIGS. 6 to 10 are shown to have the slots 39 for venting their bolt holes 34$i,o$, as previously discussed it is possible instead or in addition for the fuel cell units 10 to have vents for their bolt holes 34$a,b,c$. See FIG. 13 for such an embodiment. In that embodiment, the metal support substrate 12, the spacer 22 and the interconnect 30 all comprise slots 39 in the respective bolt voids 34 at the fuel outlet end of the cell, in the same manner as the outlet gaskets 38$o$ are provided with slots 39 in the previous embodiment, thus providing venting from the bolt voids 34 to the atmosphere. It is to be appreciated, however, that it is interchangeable as to where the slots might be provided—they need not be in each component, nor in just one set of the components, but they may be in any selection of components in a given stack, at either or both ends (fuel inlet end and/or fuel outlet end). For example, in one embodiment the spacer 22 comprises the slots 39 for venting the bolt voids 34 whereas the bolt holes 34$a$ of the interconnect and the bolt holes 34$c$ of the substrate comprise a full perimeter wall, i.e. no slots.

Returning to the first embodiment, the outlet gaskets 38$o$ of this embodiment have a length of about 110 mm and a width of about 27 mm. It is between 0.5 and 0.9 mm thick. Other thicknesses can be used, e.g. where needed to accommodate higher or lower bumps or ridges 40 in the interconnect 30. Likewise, widths and lengths can be adjusted, e.g. depending upon the location of the bolt holes 34$o$ of the outlet gaskets and the fuel ports 32$o$ of the outlet gaskets.

The bolt holes 34$o$ of the outlet gasket preferably have a diameter of about 8.5 mm for receiving an M8 bolt—or a bolt 2 having approximately an 8 mm diameter. The gap 35 between the bolt holes and the bolt is thus again about 0.25 mm (on either side of the bolt). Larger or smaller gaps 35, or larger or smaller holes of outlet gasket 34$o$, might be used, e.g. for larger or smaller bolts 2.

The fuel ports 32$o$ of the outlet gaskets are each preferably around 10 mm by 8 mm, or have a cross sectional area of around 80 mm2. As there are two, they can be half the size of the single fuel ports 32$i$ of the inlet gaskets. This provides enough area for the fuel transmission out of the fuel cell unit 10. Smaller or larger fuel ports 32$o$ of the outlet gaskets may be preferred, e.g. for lower or higher fuel delivery volumes.

The slots 39 are around 1.6 mm wide. For the given space around the bolt 2, this has been found adequate for dispersal of hydrogen and ions. The slot 39 can be wider or narrower for increasing or slowing dispersal rates, or if more or less hydrogen and ions need dispersal.

Generally useful sizes for the outlet gasket 38$o$ for the fuel output end of the fuel cell unit 10 will have no greater than twice these dimensions, and no less than half these dimensions, although they are sized to fit the size of the cell unit, as with the gaskets at the inlet end.

Figure 5:
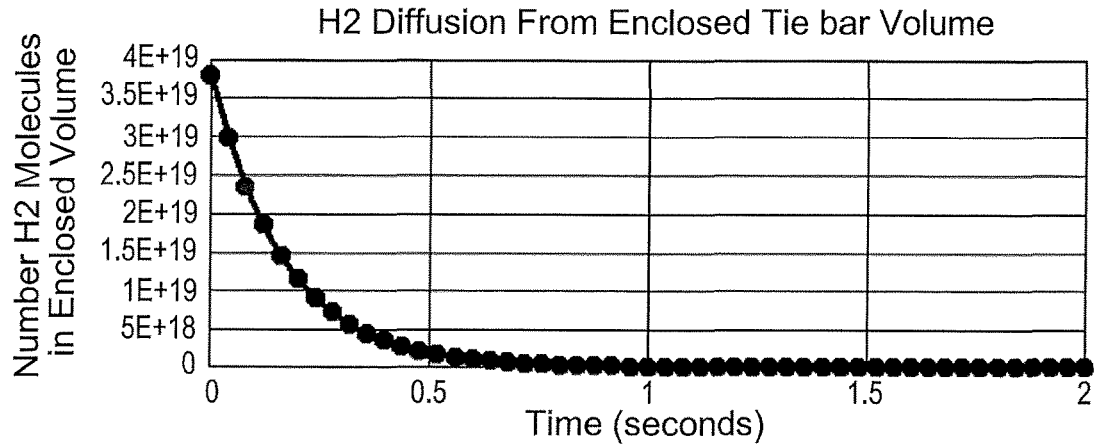
FIG. 5 shows the $H_2$ (hydrogen) diffusion from an enclosed tie bar volume.

Referring finally to FIG. 5, the speed of hydrogen diffusion out of each bolt void's 34 volume, once the slots 39 are provided in the gaskets 38, is approximately shown. As can be seen, within half a second of entry into the bolt void's 34 volume, substantially all hydrogen has already diffused out of the bolt void's 34 volume. As a consequence, it is clear that the slots, or venting, minimise the risk of hydrogen build-up and thus the environment within the bolt void 34 is no longer susceptible to combustion or arcing (shorting) between the bolts 2 and the fuel cell units 10 (i.e. across the gap 35 therebetween).

Ideally the gap 35 is maintained during assembly of a stack at a distance of no less than 0.1 mm throughout the length of the stack 1.

The present invention has hereby been disclosed purely by way of example.

Modifications in detail may be made to the invention within the scope of the claims appended hereto.

Reference signs are incorporated in the description solely to ease its understanding, and are not limiting the scope of the claims. The present invention is not limited to the above embodiments only, and other embodiments will be readily apparent to one of ordinary skill in the art without departing from the scope of the appended claims.

REFERENCE SIGNS

1—Stack
2—Bolt
3—Nut
4—End plate
5—Fuel cell stack assembly
6—Insulation gasket
8—Dummy cell unit
10—Cell unit
12—Metal support substrate
14—Electrochemically active layers
15—Channel
16—Channel
17—Air outlet 17a—Air outlet of interconnect
17b—Air outlet of spacer
17c—Air outlet of substrate
22—Spacer
23—Air channel
30—Interconnect
31—Fuel channel
32—Fuel outlet chimney
32a—Fuel outlet port of interconnect
32b—Fuel outlet port of spacer
32c—Fuel outlet port of substrate
32o—Fuel port of outlet gasket
33—Fuel inlet chimney
33a—Fuel inlet port of interconnect
33b—Fuel inlet port of spacer
33c—Fuel inlet port of substrate
33i—Fuel port of inlets gasket
34—Bolt void
34a—Bolt hole of interconnect
34b—Bolt hole of spacer
34c—Bolt hole of substrate
34i—Bolt hole of inlet gasket
34o—Bolt hole of outlet gasket
35—Gap
36—Holes (Substrate)
38—Gaskets
38i—Inlet Gasket
38o—Outlet Gasket
39—Slot
40—Lumps or bumps, ridges or troughs
42—Indentations or grooves
43—Arm
90—Weld line

The invention claimed is:

1. A stack of intermediate temperature metal supported, solid oxide fuel cell units arranged in a stack,
wherein each fuel cell unit comprises a metal support substrate with electrochemically active layers, a spacer and an interconnect,
wherein the metal support substrate, the spacer and the interconnect have bolt holes for compression bolts of the stack, at least one fuel inlet port and at least one fuel outlet port for fuel entry and exit into and out of the cell unit, and at least one air outlet,
wherein bolt voids are formed within the stack by the alignment of the respective bolt holes for the compression bolts in the stack and a further void is formed by the alignment of the respective air outlets, and
wherein the bolt voids for the compression bolts do not have fluid flow passageways for the stack extending therein, and the bolt voids each contain air, and are vented, either to the environment surrounding the stack or into an air outlet, to prevent build up of moisture, leaked or diffused hydrogen, or leaked ions, in the air in the bolt voids,
and wherein either or both:
a) venting is provided by slots provided in the bolt holes of any of the metal support substrate, the spacer and the interconnect, and
b) gaskets are located between neighbouring cell units in the stack, the gaskets having at least one fuel port aligning with fuel inlet or outlet chimneys in the cell units either side thereof, and at least one further bolt hole aligning with the bolt holes for the compression bolt in the stack either side thereof, venting being provided by slots provided in the bolt holes of the gaskets.

2. The stack of claim 1, further comprising gaskets between neighbouring fuel cell units in the stack, the gaskets having:
a) at least one fuel port aligning with either a fuel outlet chimney or a fuel inlet chimney in the cell units located either side thereof, and
b) at least one bolt hole aligning with bolt holes for the compression bolt in the cell units either side thereof.

3. The stack of claim 2, wherein there are at least two bolt holes for compression bolts at each end of the cell units.

4. The stack of claim 3, wherein the gaskets vent all the bolt voids for the compression bolts.

5. The stack of claim 4, wherein the gaskets each have two bolt holes.

6. The stack of claim 4, wherein the gaskets provide the venting by their bolt holes comprising a slot in a side thereof out to an outer edge of the gasket.

7. The stack of claim 2, having two or more fuel outlet ports for each cell unit, wherein the relevant gaskets therefor also have two or more fuel outlet ports.

8. The stack of claim 1, wherein at least some of the cell units have vents for their bolt holes.

9. The stack of claim 1, wherein at least some of the bolt voids are vented to the environment surrounding the stack.

10. The stack of claim 1, wherein at least some of the bolt voids are vented into an air outlet of the stack.

11. A gasket for a solid oxide fuel cell stack configured to flow fuel therein and comprising bolts for compression of the stack,
the gasket comprising at least one fuel port for fuel passage and two bolt holes for passing respective bolts of the solid oxide fuel cell stack therethrough, wherein the fuel port for fuel passage has a full perimeter wall whereas the two bolt holes have slots within perimeter walls thereof, breaking their peripheries, the slots extending from the perimeter walls of the bolt holes to an outer wall of the gasket, the two bolt holes thus being vented.

12. The gasket of claim 11, wherein the at least one fuel port for fuel passage is a central fuel port for fuel passage with the two bolt holes on either side thereof.

13. The gasket of claim 11, wherein the at least one fuel port for fuel passage is a pair of fuel ports at respective ends of the gasket.

14. The gasket of claim 13, wherein the ends of the gasket are spaced apart by an arm that is thinner than the ends of the gasket.

15. The gasket of claim 13, wherein the two bolt holes are located on the ends of the gasket, respectively.

16. The gasket of claim 15, wherein the two bolt holes are located between the pair of fuel ports for fuel passage.

17. The gasket of claim 11, wherein the slots of the bolt holes extend parallel to one another.

18. The gasket of claim 11, wherein the slots of the bolt holes both extend along a straight line extending between the two bolt holes.

19. The gasket of claim 11, wherein the bolt holes are generally circular and the slots of the bolt holes both extend along a straight line extending between the centres of the two generally circular bolt holes.

20. A stack of intermediate temperature metal supported, solid oxide fuel cell units arranged in a stack,
wherein each fuel cell unit comprises a metal support substrate with electrochemically active layers, a spacer and an interconnect, the stack further comprising gaskets between neighbouring fuel cell units in the stack, wherein the metal support substrate, the spacer and the interconnect have bolt holes for compression bolts of the stack, at least one fuel inlet port and at least one fuel outlet port for fuel entry and exit into and out of the cell unit, and at least one air outlet, wherein the gaskets have:

a) at least one fuel port aligning with either a fuel outlet chimney or a fuel inlet chimney in the cell units located either side thereof, and b) at least one further bolt hole aligning with the said bolt holes for the compression bolts in the cell units either side thereof, wherein bolt voids are formed within the stack by the alignment of the respective bolt holes in the stack and a further void is formed by the alignment of the respective air outlets, and wherein the bolt voids do not have fluid flow passageways for the stack extending therein, and the bolt voids are vented, either to the environment surrounding the stack or into an air outlet, the venting being provided by slots provided in either or both of i) the bolt holes of any of the metal support substrate, the spacer and the interconnect, and ii) the bolt holes of the gaskets.

* * * * *